(12) United States Patent
Felt et al.

(10) Patent No.: US 7,337,441 B2
(45) Date of Patent: Feb. 26, 2008

(54) SYSTEM AND METHOD FOR PREPREPARING A TRANSACTION PROCESS INVOLVING A CHAIN OF SERVERS IN A CIRCULAR FLOW

(75) Inventors: Edward P. Felt, deceased, late of Matawan, NJ (US); Sandra V. Felt, legal representative, Matawan, NJ (US); Priscilla Fung, Union City, CA (US); Alexander J. Somogyi, Bedminster, NJ (US); Sriram Srinivasan, Berkeley, CA (US)

(73) Assignee: Bea Systems, Inc., San Jose, CA (US)

( * ) Notice: Subject to any disclaimer, the term of this patent is extended or adjusted under 35 U.S.C. 154(b) by 979 days.

(21) Appl. No.: 10/196,322

(22) Filed: Jul. 15, 2002

(65) Prior Publication Data

US 2003/0036919 A1  Feb. 20, 2003

Related U.S. Application Data

(60) Provisional application No. 60/308,693, filed on Jul. 30, 2001, provisional application No. 60/306,105, filed on Jul. 17, 2001.

(51) Int. Cl.
| | |
|---|---|
| G06F 9/46 | (2006.01) |
| G06F 15/16 | (2006.01) |
| G06Q 10/00 | (2006.01) |
| G06Q 30/00 | (2006.01) |

(52) U.S. Cl. .................. 718/101; 709/203; 705/5; 705/26

(58) Field of Classification Search ................ 718/101; 709/203; 705/5, 26
See application file for complete search history.

(56) References Cited

U.S. PATENT DOCUMENTS

| 5,586,312 A | 12/1996 | Johnson et al. ............. 395/610 |
| 5,764,897 A | 6/1998 | Khalidi |

(Continued)

FOREIGN PATENT DOCUMENTS

EP   0674260 A2   9/1995

(Continued)

OTHER PUBLICATIONS

European Search Report dated May 5, 2007 in connection with EP Application No. 02748181.1, 3 pages.

(Continued)

*Primary Examiner*—Meng-Al T. An
*Assistant Examiner*—Kenneth Tang
(74) *Attorney, Agent, or Firm*—Fliesler Meyer LLP

(57) ABSTRACT

The invention provides a mechanism for allowing a transaction callback processing to be synchronized or to take effect prior to completion of a transaction or message. Additional Synchronization objects that will take part in the transaction can be registered on any server during the transaction's active phase. After the commit function is called, each Synchronization object is called during the transaction preprepare processing. A Synchronization object can register another Synchronized object, call a server not previously involved in the transaction, or involve a new XA resource in the transaction. The effect is to provide a circular pattern of request passing that allows additional resources to be added into the loop prior to commit.

19 Claims, 14 Drawing Sheets

U.S. PATENT DOCUMENTS

| | | | |
|---|---|---|---|
| 5,857,100 A | 1/1999 | Phillips et al. | 395/671 |
| 5,864,679 A | 1/1999 | Kanai et al. | |
| 5,872,969 A * | 2/1999 | Copeland et al. | 718/101 |
| 5,958,004 A | 9/1999 | Helland et al. | 709/101 |
| 5,987,502 A | 11/1999 | Banks et al. | 709/203 |
| 6,038,589 A | 3/2000 | Holdsworth et al. | 709/201 |
| 6,058,267 A | 5/2000 | Kanai et al. | |
| 6,101,527 A | 8/2000 | Lejeune et al. | 709/201 |
| 6,243,737 B1 | 6/2001 | Flanagan et al. | |
| 6,266,698 B1 | 7/2001 | Klein et al. | 709/227 |
| 6,275,863 B1 | 8/2001 | Leff et al. | 709/248 |
| 6,298,072 B1 | 10/2001 | Koliczew | 370/503 |
| 6,308,287 B1 | 10/2001 | Mitchell et al. | 714/19 |
| 6,338,146 B1 | 1/2002 | Johnson et al. | 714/2 |
| 6,411,981 B1 | 6/2002 | Klein et al. | |
| 6,714,962 B1 | 3/2004 | Helland et al. | |
| 6,898,574 B1 | 5/2005 | Regan | |
| 2002/0038243 A1 | 3/2002 | Amano et al. | |
| 2002/0087366 A1 | 7/2002 | Collier et al. | |

FOREIGN PATENT DOCUMENTS

| | | |
|---|---|---|
| EP | 0187036 A2 | 1/1998 |

OTHER PUBLICATIONS

European Search Report dated May 5, 2007 in connection with EP Application No. 02756488.9, 3 pages.

\* cited by examiner

SYSTEM AND METHOD FOR PREPREPARING A TRANSACTION PROCESS INVOLVING A CHAIN OF SERVERS IN A CIRCULAR FLOW

CLAIM OF PRIORITY

This application claims priority from provisional applications "SYSTEM FOR TRANSACTION PROCESSING WITH SYNCHRONIZED CALLBACK PROCESSING FEATURE"Application No. 60/306,105, filed Jul. 17, 2001, and "SYSTEM FOR TRANSACTION PROCESSING WITH SYNCHRONIZED CALLBACK PROCESSING FEATURE", Application No. 60/308,693, filed Jul. 30, 2001 and which applications are incorporated herein by reference.

CROSS REFERENCE

This application is related to copending utility applications "SYSTEM FOR TRANSACTION PROCESSING WITH TRANSACTION PROPERTY FEATURE", application Ser. No. 10/196,687, Inventors: Edward P. Felt, Priscilla Fung, Alex Somogyi, and Sriram Srinivasan, filed Jul. 15, 2002; "SYSTEM FOR TRANSACTION PROCESSING WITH DELEGATED COMMIT FEATURE", application Ser. No. 10/196,297, Inventors: Edward P. Felt, Priscilla Fung, Alex Somogyi, and Sriram Srinivasan, filed Jul. 15, 2002; all of which are herein incorporated by reference, in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to application and transaction servers and particularly to a system for allowing a callback process to be synchronized with the completion of a transaction or message.

BACKGROUND OF THE INVENTION

The Java 2 Platform, Enterprise Edition (J2EE) specification, defines one of the current standards for developing multi-tier enterprise applications. J2EE provides a component-based approach to the design, development, assembly, and deployment of enterprise applications, which both reduces the cost and enables faster design and implementation. The J2EE platform gives the developer a multi-tiered distributed application model, the ability to reuse components, a unified security model, and flexible transaction control. Not only can they deliver innovative customer solutions to market faster than ever, but the resultant platform-independent J2EE component-based solutions are not tied to the products and application program interfaces (APIs) of any one vendor.

The J2EE specification defines the following kinds of components: application client components; Enterprise JavaBeans (EJB); servlets and Java Server Pages (JSP) (also called Web components); and applets. A multi-tiered distributed application model implies that the application logic is divided into components according to function, and different application components may make up a J2EE application on the same or different servers. Where an application component is actually installed depends on which tier in the multi-tiered J2EE environment the application component belongs. These tiers are depicted in FIG. 1. As shown therein an application server tier 4 is used to develop EJB containers and/or presentation containers such as servlets, JSP, and html pages 14. These in turn are used as an interface between a client tier 2, where the clients 8 and client applications are deployed, and a backend tier 6, used for hosting enterprise or legacy applications such Enterprise Resource Planning (ERP) systems.

Client tier—These can be browsers, Java-based programs, or other Web-enabled programming environments running within the client tier, both inside and outside of corporate firewalls.

Application Server tier—Normally this tier hosts a combination of presentation logic and business logic to support client requests. Presentation logic is supported via JSP pages and servlets that display HTML pages, while business logic is supported via Remote Method Invocation (RMI) objects and EJBs. EJBs rely upon the container environment for transactions, lifecycle and state management, resource pooling, security, etc., which together make up the run time environment in which the beans are executed.

Back-end tier—This is generally a combination of existing applications and data stores. It is also referred to as the Enterprise Information Systems (EIS) tier, since it may include such systems as Enterprise Resource Planning (ERP), mainframe transaction processing, database systems, and other legacy information systems.

Since the components of a J2EE application run separately, and often on different devices, there needs to be a way for client and application server tier code to look up and reference other code and resources. Client and application code can, for example, use the Java Naming and Directory Interface (JNDI) 16 to look up user-defined objects such as enterprise beans, and environment entries such as the location of the Java Database Connector (JDBC) DataSource objects, which in turn are used for looking up resources in backend tier, and message connections.

Application behavior such as security and transaction management can be configured at deployment time on Web and enterprise bean components. This deployment time feature decouples application logic from the configuration settings that might vary with the assembly. The J2EE security model lets a developer configure a Web or enterprise bean component so that system resources are accessed only by authorized users. For example, a Web component can be configured to prompt for a user name and password. An Enterprise Bean component can be configured so that only persons in specific groups can invoke certain kinds of its methods. Alternatively, a servlet component might be configured to have some of its methods accessible to everyone, and a few methods accessible to only certain privileged persons in an organization. The same servlet component can be configured for another environment to have all methods available to everyone, or all methods available to only a select few.

Some application servers, such as the WebLogic Server product from BEA Systems, Inc., San Jose, Calif., use an Access Control List (ACL) mechanism that allows for fine-grained control of the usage of components running on the server. Using an ACL, a developer can define at the Java Method level what can, or cannot, be executed by which user or group of users. This ACL mechanism covers anything that runs on the application server except for EJBs, which have their own access control mechanism defined in the EJB specification. Security realms allow the administrator to import information from existing authorization or authentication systems into the ACL.

Java Servlets

A servlet is a program that extends the functionality of a Web server. A servlet receives a request from a client, dynamically generates the response (possibly querying databases to fulfill the request), and then sends the response containing an HTML or XML document to the client. Servlets are similar to CGI but are typically easier to write, since servlets use Java classes and streams. They execute faster because servlets are compiled to Java byte code and at run time the servlet instance is kept in memory, each client request running in a separate thread. Servlets make it easy to generate data to an HTTP response stream in a dynamic fashion. Client requests may be performed over new connections, so flow control does not come naturally between requests. To allow for this session management maintains the state of specific clients between requests. In some application servers, servlets make use of the HTTP session object to save their state between method requests. This object can be replicated in a clustered environment for failover purposes.

Java Server Pages

JSP pages are a text-based, presentation-centric way to develop servlets. JSP pages offer all the benefits of servlets, and when combined with a JavaBeans class, provide an easy way to keep content and display logic separate. Both JSP pages and servlets are more desirable than Common Gateway Interface (CGI), because they are platform-independent, and use less overhead. JSP pages can be used with JavaBeans classes to define Web templates for building a Web site made up of pages with a similar look and feel. The JavaBeans class performs the data rendering, so the templates have no Java code. This means they can be maintained by an HTML editor. Simple Web-based application using a JSP page can be used to bind content to application logic using custom tags or scriptlets instead of a JavaBeans class. Custom tags are bundled into tag libraries that are imported into a JSP page. Scriptlets are small Java code segments embedded directly in the JSP page.

Database Access Services (JDBC)

JDBC acts as a bridge to relational databases, and is modeled on the ODBC (Open Database Connectivity) specification. It decouples the database from the program code through the use of drivers. Some implementations of JDBC provide support for advanced data types, and also support the functionality of scrollable result sets and batch updates.

Java Messaging Services (JMS)

JMS is the J2EE mechanism used to support the exchange of messages between Java programs. This is how Java supports asynchronous communication, wherein the sender and receiver don't need to be aware of each other and thus can operate independently. JMS supports two messaging models:

Point to point—which is based on message queues. In this model message producer sends a message to a queue. A message consumer can attach itself to a queue to listen for messages. When a message arrives on the queue, the consumer takes it off the queue and responds to it. Messages can be sent to just one queue and will be used by just one consumer. Consumers have the option to filter messages to specify the exact message types they want.

Publish and subscribe—which allows producers to send messages to a topic and for all the registered consumers for that topic to retrieve those messages. In this case, many consumers can receive the same message.

Java Interface Definition Language (IDL)

CORBA objects use an IDL to specify a contract, ie. how they are going to interact with other objects. With Java IDL, contracts may be defined between the Java world and the CORBA world. Starting with Sun's JDK1.2, an ORB is included, which allows Java applications to invoke remote CORBA objects via the Internet InterORB (IIOP) protocol.

Enterprise JavaBeans (EJB)

EJB components are designed to encapsulate business logic, so that the developer does not have to be concerned with programming code for typical tasks such as database access, transaction support, security, caching, and concurrency. In the EJB specification these tasks are the responsibility of the EJB container. An enterprise bean consists of interfaces and classes. Clients access enterprise bean methods through the enterprise bean's home and remote interfaces. The home interface provides methods for creating, removing, and locating the enterprise bean and the remote interface provides the business methods. At deployment time, the container creates classes from these interfaces that it then uses to provide access to clients seeking to create, remove, locate, and call business methods on the enterprise bean. The enterprise bean class provides the implementations for the business methods, create methods, and finder methods; and if the bean manages its own persistence, provides implementations for its lifecycle methods.

There are two types of enterprise beans: entity beans and session beans. A session bean represents a transient conversation with a client, and might execute database reads and writes. A session bean can invoke the JDBC calls itself, or it can use an entity bean to make the call, in which case the session bean is a client to the entity bean. A session bean's fields contain the state of the conversation and are transient. If the server or client crashes, the session bean is gone.

An entity bean represents data in a database and the methods to act on that data. In a relational database context for a table of employee information, there may be one bean for each row in the table. Entity beans are transactional and long-lived. As long as the data remains in the database, the entity bean exists. This model can be easily used for relational databases and is not restricted to object databases.

Session beans can be stateful or stateless. A stateful session bean contains conversational state on behalf of the client. The conversational state is the session bean's instance field values plus all objects reachable from the session bean's fields. Stateful session beans do not represent data in a persistent data store, but they can access and update data on behalf of the client. Stateless session beans do not have any state information for a specific client. They typically provide server-side behavior that does not maintain any particular state. Stateless session beans require fewer system resources. A business object that provides a generic service or represents a shared view of stored data is a good candidate for a stateless session bean.

An enterprise bean using container-managed persistence to access a relational database does not require the developer to use any JDBC 2.0 APIs for database access because the container handles this. However, if bean-managed persistence is used, or if there is a need to access an enterprise information system other than a relational database, then the appropriate code to do it must be provided.

In the case of an enterprise bean using bean-managed persistence to access a database, the bean's lifecycle methods with JDBC 2.0 API code must be implemented to handle loading and storing data and maintaining consistency between the run time and persistent database storage. While the Web tier uses HTTP or HTTPS to transfer data between tiers, the EJB tier uses RMI-IIOP. RMI-IIOP is a full-scale distributed computing protocol that gives any client or Web tier program accessing an enterprise bean direct access to the services in the EJB tier. These services include JNDI for referencing enterprise beans, Java Messaging Service (JMS) for sending and receiving asynchronous messages, and JDBC for relational database access.

Transaction Management

One of the most fundamental features of any application server, such as the WebLogic Server system is transaction management. Transactions are a means to guarantee that database transactions are completed accurately and that they take on all the "ACID" properties of a high-performance transaction, including:

Atomicity—all changes that a transaction makes to a database are made permanent; otherwise, all changes are rolled back.

Consistency—a successful transaction transforms a database from a previous valid state to a new valid state.

Isolation—changes that a transaction makes to a database are not visible to other operations until the transaction completes its work.

Durability—changes that a transaction makes to a database survive future system or media failures.

The J2EE transaction model lets the application developer specify, at deployment time, the relationships among methods which comprise a single transaction, so that all methods in one transaction are treated as a single unit. This is desirable because a transaction is a series of steps that must all complete, or if they do not all complete then all reversed. For example, the developer might have a series of methods in an enterprise bean that move money from one bank account to another, by debiting the first account, and crediting the second account. In this example, they would want the entire transfer operation to be treated as one unit, so that if there is a failure after the debit and before the credit, then the debit is rolled back.

Transaction attributes are specified on an application component during assembly, allowing the developer to group methods into transactions across application components. In this manner application components can be changed within a J2EE application, and the transaction attributes reassigned without changing code. The Java Transaction Service (JTS) and Java Transaction API (JTA) form the basis of the transactional support in J2EE and more specifically for EJB and JDBC 2.0. The JTS specification is a low-level application program interface (API) for transaction management that maps Java to the Object Management Group (OMG) Object Transaction Service. The JTA specification was developed by Sun Microsystems in cooperation with leading industry partners in the transaction processing and database system arena and specifies standard Java interfaces between a transaction manager, the resource manager, the application server, and the transactional applications. Specifically, JTA is a high-level API that consists of two parts:

Transaction Interface—This enables the work done by distributed components to be bound by a global transaction, and is a way of marking or identifying groups of operations constituting a transaction.

XA Resource Interface—an interface based upon the X/Open or XA interface that enables the handling of distributed transactions. These involve the coordination of transactions across more than one resource, such as within or between a database or queue.

Most of the time the developer does not need to be concerned about programming explicit transactions with JTA, since that work is performed through the JDBC and EJB API's handled by the container and configured by the application deployment descriptor. The developer can instead focus on the design of the transaction, rather than on its implementation.

WebLogic Server supports both distributed transactions and a two-phase commit protocol for enterprise applications. A distributed transaction is a transaction that updates multiple resource managers (such as databases) in a coordinated manner. In contrast, a local transaction updates a single resource manager. The two-phase commit protocol is a method of coordinating a single transaction across two or more resource managers. It guarantees data integrity by ensuring that transactional updates are committed in all of the participating databases, or are fully rolled back out of all the databases, reverting to the state prior to the start of the transaction. In other words, either all the participating databases are updated, or none of them are updated. Distributed transactions involve the following participants:

Transaction originator—initiates the transaction. The transaction originator can be a user application, an Enterprise JavaBean, or a JMS client.

Transaction manager—manages transactions on behalf of application programs. A transaction manager coordinates commands from application programs to start and complete transactions by communicating with all resource managers that are participating in those transactions. When resource managers fail during transactions, transaction managers help resource managers decide whether to commit or roll back pending transactions.

Recoverable resource—provides persistent storage for data. The resource is most often a database.

Resource manager—provides access to a collection of information and processes.

Transaction-aware JDBC drivers are common resource managers. Resource managers provide transaction capabilities and permanence of actions; they are entities accessed and controlled within a distributed transaction. The communication between a resource manager and a specific resource is called a transaction branch.

The first phase of the two-phase commit protocol is called the prepare phase. The required updates are recorded in a transaction log file, and the resource must indicate, through a resource manager, that it is ready to make the changes. Resources can either vote to commit the updates or to roll back to the previous state. What happens in the second phase depends on how the resources vote. If all resources vote to commit, all the resources participating in the transaction are updated. If one or more of the resources vote to roll back, then all the resources participating in the transaction are rolled back to their previous state.

Support for Business Transactions

Transactions are appropriate in the example situations described below (although these situations are merely illustrative and not exhaustive).

As a first example, the client application needs to make invocations on several objects, which may involve write operations to one or more databases. If any one invocation is unsuccessful, any state that is written (either in memory or, more typically, to a database) must be rolled back. For example, consider a travel agent application. The client application needs to arrange for a journey to a distant location; for example, from Strasbourg, France, to Alice Springs, Australia. Such a journey would inevitably require multiple individual flight reservations. The client application works by reserving each individual segment of the journey in sequential order; for example, Strasbourg to Paris, Paris to NewYork, NewYork to Los Angeles. However, if any individual flight reservation cannot be made, the client application needs a way to cancel all the flight reservations made up to that point. The client application needs a conversation with an object managed by the server application, and the client application needs to make multiple invocations on a specific object instance. The conversation may be characterized by one or more of the following:

Data is cached in memory or written to a database during or after each successive invocation; data is written to a database at the end of the conversation; the client application needs the object to maintain an in-memory context between each invocation; that is, each successive invocation uses the data that is being maintained in memory across the conversation; at the end of the conversation, the client application needs the ability to cancel all database write operations that may have occurred during or at the end of the conversation.

As an alternate example, consider an Internet-based online shopping cart application. Users of the client application browse through an online catalog and make multiple purchase selections. When the users are done choosing all the items they want to buy, they proceed to check out and enter their credit card information to make the purchase. If the credit card check fails, the shopping application needs a mechanism to cancel all the pending purchase selections in the shopping cart, or roll back any purchase transactions made during the conversation. Within the scope of a single client invocation on an object, the object performs multiple edits to data in a database. If one of the edits fails, the object needs a mechanism to roll back all the edits. (In this situation, the individual database edits are not necessarily EJB or RMI invocations. A client, such as an applet, can obtain a reference to the Transaction and TransactionManager objects, using JNDI, and start a transaction.)

As another example, consider a banking application. The client invokes the transfer operation on a teller object. The transfer operation requires the teller object to make the following invocations on the bank database: invoking the debit method on one account; and invoking the credit method on another account. If the credit invocation on the bank database fails, the banking application needs a mechanism to roll back the previous debit invocation.

A problem with the traditional methods of transaction management described above is that they lack efficiency in the manner in which transaction callbacks are processed. Each committing server must contact each participating server directly prior to communicating back to the client. Furthermore, the traditional methods lack flexibility—for example there is no mechanism to allow a new server or resource to enlist in a transaction after the commit function has been called. This limits both the scalability and potential usability of the traditional methods and prevents the development of the increasingly complex applications required by today's businesses.

SUMMARY OF THE INVENTION

The invention provides a mechanism, for use in or with an application server or transaction processing system, for allowing callback processing to be synchronized (or to take effect) prior to the completion of a transaction. During a transaction's life cycle, there are several state transitions, including those between the active, handoff, pre-preparing, preparing, logging, and commit states. In accordance with an embodiment of the invention, Synchronization objects can be registered on any server during the active phase. After the commit( ) function is called, each Synchronization object is called during the preprepare processing phase. One Synchronization object can register another, or can allow a Synchronization object to call a server not previously involved in the transaction. A Synchronization object can also involve a new XA resource in the transaction. As used herein, the term Synchronization and Synchronization object are used to refer to the programming interface specified by the JTA specification that requires that the Transaction Manager invoke a Synchronization.beforeCompletion method after commit is called. Application code can register for these callbacks during the active phase of the transaction.

Circular control flows in a loop between servers, ending at a commit server when all Synchronization callbacks are complete. If new Synchronization objects or servers are later added, they can be inserted into the loop. All Synchronization callbacks are completed before any resources are prepared, to address those instances in which a Synchronization callback needs to access the resource. This circular control flow process reduces the number of messages, compared to the traditional method in which a commit server would contact each participating server directly. The ability to dynamically add servers and resources, passing this server list along the circular control flow, adds great flexibility to the transaction processing system and to application servers and applications built on top of it. In one embodiment the invention comprises a system for transaction processing that synchronizes transaction callbacks with the completion of a transaction comprising a plurality of Synchronization objects and resources that can be associated with a transaction, a transaction coordinator that registers, for a particular transaction, a set of at least one or a plurality of transaction subcoordinators, together with a selection of Synchronization object callbacks and resources, to participate in the particular transaction, and wherein the set of transaction subcoordinators can be modified prior to committing the transaction, to reflect a change in the selection of Synchronization object callbacks and resources participating in the particular transaction. Another embodiment of the invention comprises a method for transaction processing that synchronizes transaction callbacks with the completion of a transaction, comprising the steps of providing a plurality of Synchronization objects and resources that can be associated with a transaction, registering at a transaction coordinator, for a particular transaction, a set of at least one or a plurality of transaction subcoordinators, together with a selection of Synchronization object callbacks and resources, to participate in the particular transaction, and wherein said set of transaction subcoordinators can be modified prior to committing the transaction, to reflect a change in the selection of Synchronization object callbacks and resources participating in the particular transaction.

BRIEF DESCRIPTION OF THE FIGURES

FIG. 15 illustrates how transactions work in an EJB application in accordance with an embodiment of the invention.

DETAILED DESCRIPTION

Generally described, the invention provides a mechanism for use in a transaction or application server, that allows callback processing to be synchronized prior to the completion of a transaction. During this period, Synchronization objects can be registered on any server during the transaction active phase. When the commit function is called each Synchronization object is called in turn during a preprepare phase. The advantage in doing this is that Synchronization objects can be added to the chain prior to the commit period. One Synchronization object can register another or can allow a Synchronization object to call a server not previously involved in the transaction.

Circular control flows in a loop between servers, ending at a commit server when all Synchronization callbacks are complete. If new Synchronization objects or servers are later added, they are inserted into the loop. All Synchronization callbacks are completed before any resources are prepared, to address instances in which a Synchronization callback needs to access the resource. Circular control flow reduces the number of messages, compared to the traditional method in which a commit server would contact each participating server directly. The ability to dynamically add servers and resources, passing this server list along the circular control flow, adds great flexibility to the transaction processing system and to application servers and applications built on top of it.

Figure 1:
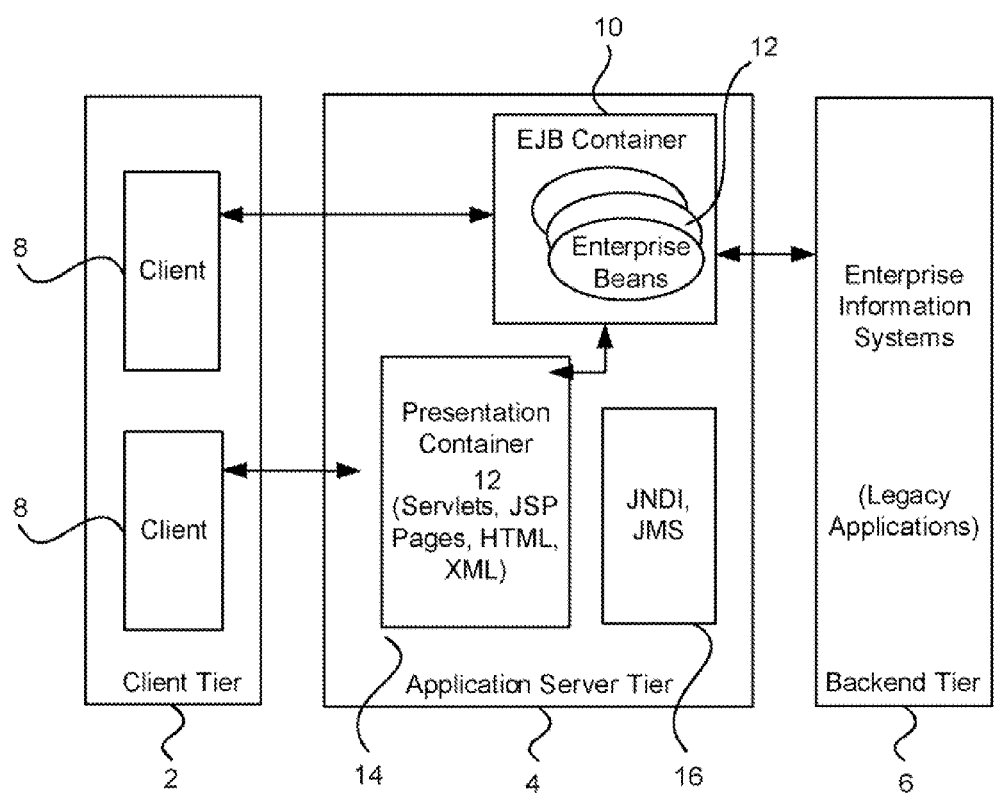
FIG. 1 shows an illustration of the J2EE architecture.
Figure 2:
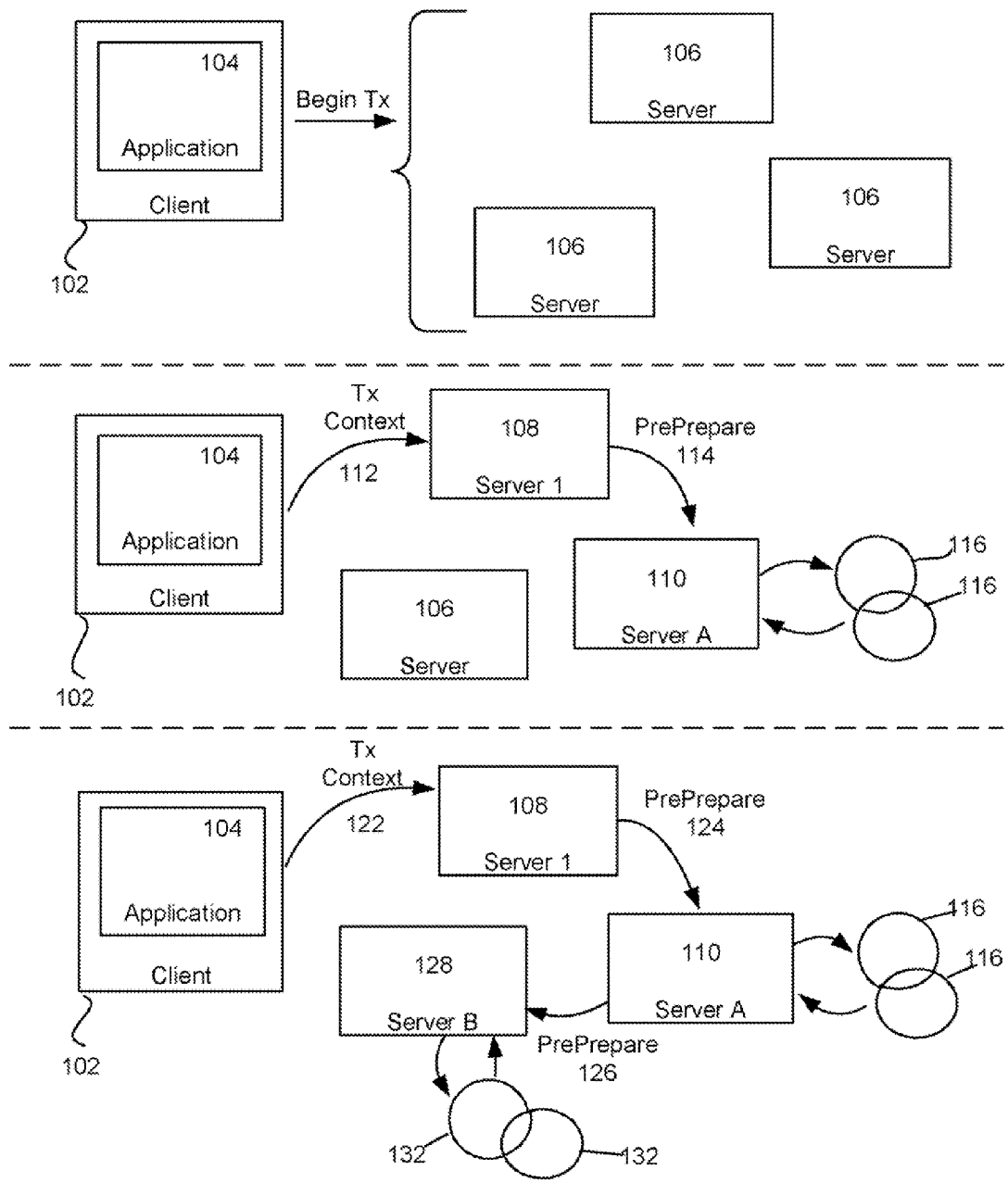
FIG. 2 shows an illustration of a synchronized callback feature in accordance with the invention.

FIG. 2 illustrates a schematic of one embodiment of the invention, showing how additional servers and Synchronization objects can be included in the synchronization callback loop prior to the commit and callback phases. As shown in FIG. 2, a client 102 including a client application 104 initiates or begins a transaction involving a number of servers 106, or resources on those servers. Typically, the client application 104 will specify a particular transaction context 112 that tells the servers which servers, and which server resource objects or resources, should be included in the particular transaction. As used herein the term "Synchronization object" is used to refer to a server object that allows the server to participate in a transaction. Synchronization objects are regularly used in object-oriented systems, including Java-based systems, to maintain transient state data. The Synchronization object moves data to and from one or more Resource objects registered with the same transaction before the transaction completes. For example, as shown in FIG. 2 the transaction context 112 may specify that a server 1 108, and a server A 110, will participate in the transaction, including one or more objects or resources 116 located a server A. Note that in one embodiment any of the servers 106 can be chosen as the initial server 1 to begin the chain of processing. During the preprepare phase, the servers are added into the loop, prior to the commit period. At any point prior to committing the transaction, the client application may alter the transaction context 122 to add another server B 128, including perhaps any Synchronization objects and resources 132 located on that server. The invention thus provides a mechanism to include server B into the prepare loop. Servers can also be added during the active and preprepare phase. The transaction context is not typically exposed to be changed by the client application directly. Instead, when the application makes call to other J2EE components, the J2EE container will register additional Synchronization objects or enlist additional XAResource objects with the transaction, e.g. (1) when application calls EJBs, then the EJB container will register Synchronization object with the Transaction Manager on behalf of the EJBs, or (2) when application accesses the database through JDBC, then the Weblogic JDBC connection pool will enlist the XAResource associated with the database instance with the Transaction Manager.

It will evident to one skilled in the art, that while a first server 1 108, is identified in FIG. 2 as the coordinator for the transaction, any of the servers can assume this role for a given transaction, and the server chosen as the transaction coordinator may be chosen using a variety of different means, including simply choosing the first server contacted by the client. A transaction coordinator may or may not participate in providing the actual resources for use with the transaction. One of the features of the invention that results from this is that the client application may be modified to change the transaction context at any point in time, and the change in Synchronization objects or resources are effected immediately. For example, if the client application is an EJB, the transaction context may be modified during the prepare or commit phase to include different resources on different servers, and these resources can be dynamically entered into the chain of processing. This allows great flexibility in modifying the client application.

Figure 3:
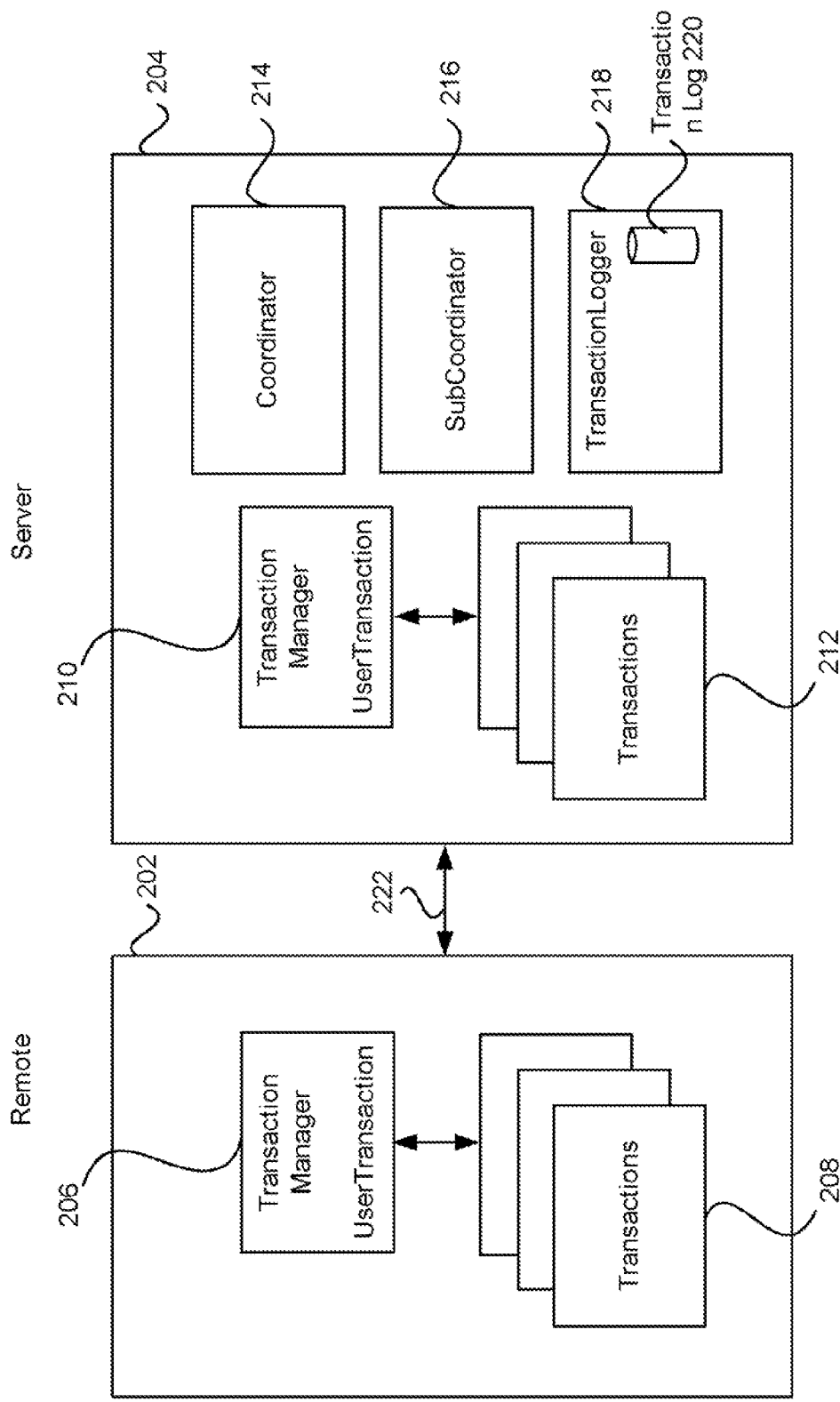
FIG. 3 shows an illustration of a typical client-server system for use with the invention.

FIG. 3 shows an illustration of a typical client-server system for use with the invention. A remote device or application 202, commonly referred to as a client application, communicates with an application server 204, or more typically with an application hosted at the application server. At the client end, a transaction manager 206 is used by the client applications to send and receive transaction 208 to the server (or to many servers). Similarly at the server end, a transaction manager 210 is used to manage transactions with the clients. In one embodiment the server may also include a transaction coordinator 214 for coordinating the transaction commit process, subcoordinator 216 for participating in the transaction and performing various phases of the commit processing on the Synchronization and XAResource objects registered with the local Transaction Manager, and transaction logger 218 for logging transactions. As transactions are created and processed they can be recorded in a transaction log 220 for later audit, reference, or rollback purposes. The invention provides a transaction manager that allows properties to be associated with each transaction. A client or server application can then analyze these properties as the transaction is communicated 222, and react accordingly.

Figure 4:
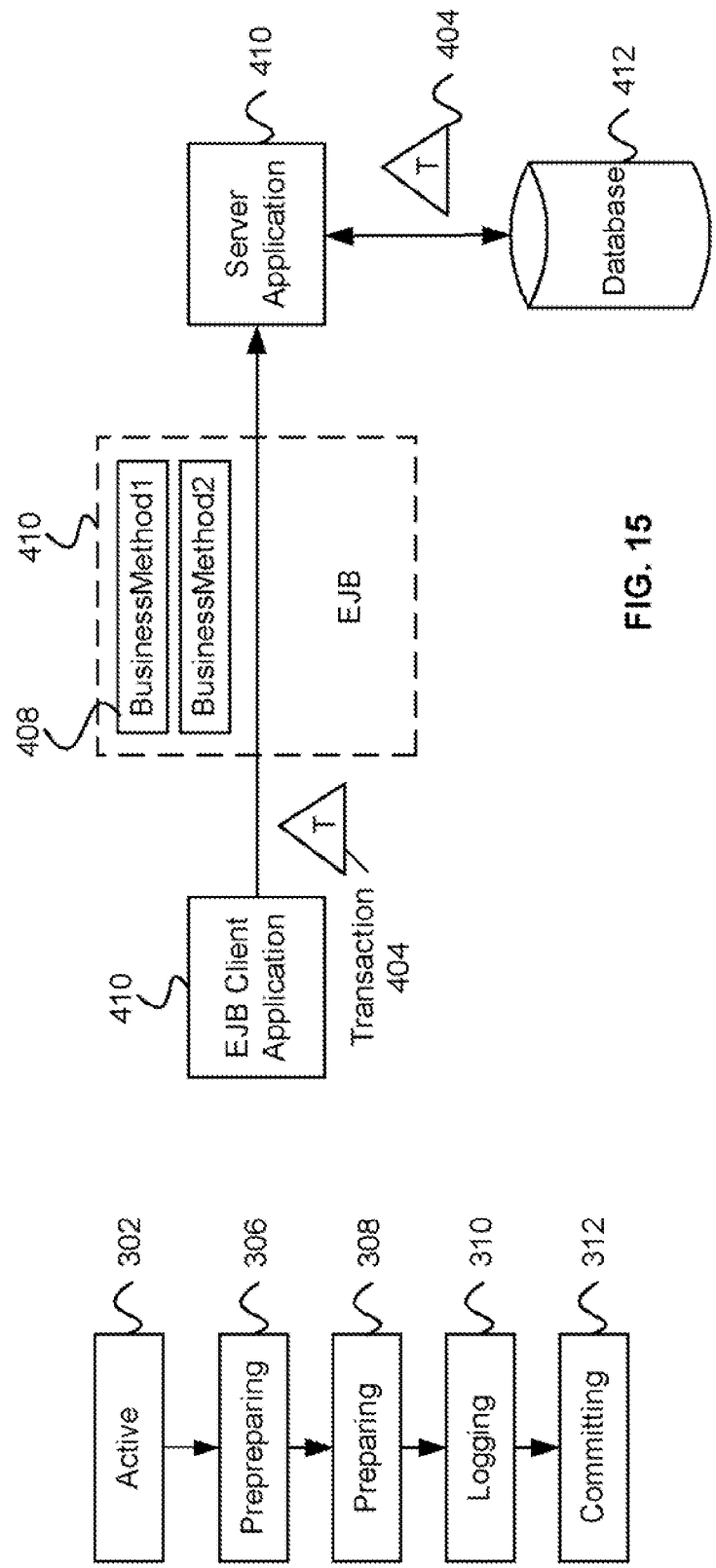
FIG. 4 shows an illustration of various transaction states in accordance with an embodiment of the invention.

FIG. 4 shows an illustration of various transaction states in accordance with an embodiment of the invention. FIG. 4 shows the various states or phases on the transaction lifecycle, including the Active 302, Pre-Preparing 306, Preparing 308, Logging 310, and Committing 312 states. During any transaction's life cycle, there are thus several state transitions, including those between the active, handoff, pre-preparing, preparing, logging, and commit states. In the active state an application or application code running on a client is designed to contact several servers during the actual execution of the transaction. The client is responsible for remembering which servers were contacted and also some other details regarding the transaction. In accordance with one embodiment of the invention the first server contacted is designated as the "commit server" or transaction coordinator. When the client calls for a "commit" the actual responsibility for committing the transaction is delegated or handed off to the commit server. Other than the fact that the commit server is responsible for processing the commit, it may be a regular server, and in many instances any of the servers can assume the role of commit server. Which one actually ends up with the responsibility (and thus becomes the commit server) depends on the actual implementation.

Application servers typically support a variety of application types and transaction types. J2EE compliant application servers should support both EJB and RMI applications. Depending on the application type, a variety of transaction processing methods may be used. The Weblogic server product is one such application server product, and its implementation is frequently described herein for purposes of illustrating the invention. It will be evident to those skilled in the art that the systems and methods provided by the invention can be equally used with other transaction processing systems, and with other types of application servers.

Figure 5:
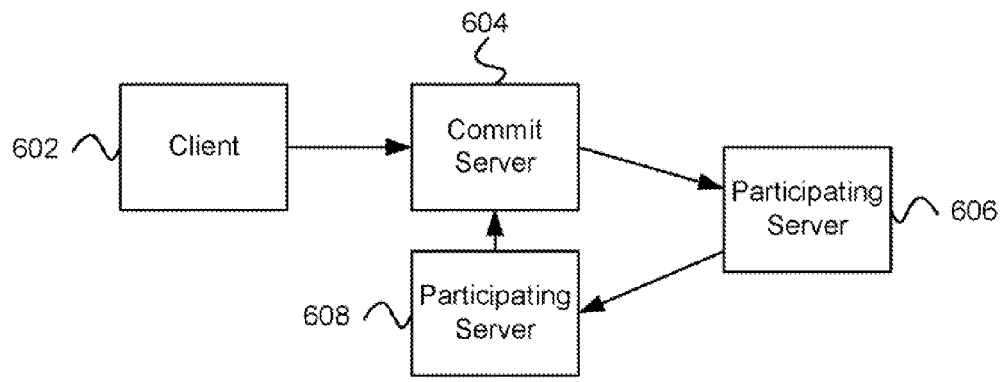
FIG. 5 shows a first illustration of a transaction synchronized callback system in accordance with an embodiment of the invention.

FIG. 5 illustrates a transaction system in accordance with an embodiment of the invention that uses synchronization callbacks to process transactions. When the client 602 tries to communicate or process a transaction, a plurality of servers 604, 606, 608 can be contacted to determine which one will actually process the transaction. Depending on the implementation one of the servers is chosen to act as the commit server/transaction coordinator, while the others are considered merely participating servers. For purposes of illustration only a single commit server and two participating servers are shown in FIG. 5, although it will be evident that many servers can be used (and most likely will be used to provide availability) in real world situations. Likewise, it will be evident that although in this example a designated commit server and participating server are shown, in other embodiments each server within the plurality of servers can act either as the commit server, or merely as a participating server. The system provided by the invention is flexible both as to the number and types of servers used. Once selected, the commit server takes on responsibility for handling the commit process. The transaction process is handled by communication between the client 602 and the commit server 604 alone, without any further communication between the client and the participating server 606. The commit server itself handles all transaction processing with the participating server 606 (or server 606, 608), and moves the transaction through the pre-preparing, preparing, logging, and commit steps. When the commit processing is complete, the commit server returns the commit to the client. Additional servers or participants can be inserted into the transaction process at any time during the preprepare phase, and prior to callback.

Typical Example of Synchronized Callback

The above described process can be illustrated by considering a typical example of a transaction involving multiple subcoordinators (servers) and synchronization objects thereon. A typical transaction progresses through five distinct phases:

1. Active phase.
2. [Transaction commit is called].
3. Pre-prepare phase (this phase involves calling of Synchronization callbacks, i.e. Synchronization.beforeCompletion, only, but not calling any resources).
4. Prepare phase (this involves calling resources only, but not Synchronization callbacks).
5. Commit phase (this also involves calling resources only, but not Synchronization callbacks).

During step 3, the pre-prepare phase, new Synchronization objects may be registered with the transaction. New resources may also be added in the pre-prepare phase that will then participate in the transaction. These resources will be later invoked during steps 4 and 5. Typically resources are added, but not deleted from a transaction. New subcoordinators (i.e. servers) may participate in the transaction during the pre-prepare phase.

For example, if one considers a situation in which there is one client and three servers, S1, S2, S3; three Synchronization objects, Sync1 on server S1, Sync2 on server S2, Sync3 on server S3; and three resource objects, r1 on S1, r2 on S2, r3 on S3. If the client initiates or starts a transaction T1, and that transaction T1 propagates to server S1, then in accordance with one embodiment of the invention, server S1 will become the commit server/transaction coordinator for this transaction. Other embodiments and implementations may use alternative mechanisms of choosing a transaction coordinator from the plurality of available servers. In the active phase of a transaction T1 we then have the following initial state information:

| | |
|---|---|
| Subcoordinators (servers) that are currently participating in transaction T1: | S2 |
| Synchronization objects that are registered with T1: | Sync1 (from server S1) Sync2 (from server S2) |
| Resources participating in transaction T1: | r1 (from server S1) r2 (from server S2) |

When the client later calls a T1.commit( ), or an equivalent function, to commit the transaction, the following sequence of events happens:

1. The commit hands off to the coordinator, server S1.

2. Server S1 executes the pre-prepare phase. Server S1 calls Synchronization callbacks that are registered locally: Sync1. Server S1 sends startPreprepare request to the first subcoordinator in the chain: S2.

3. Server S2 executes the pre-prepare phase. Server S2 calls Synchronization.beforeCompletion of the Synchronization callbacks that are registered locally: Sync2. The Sync2.beforeCompletion function calls an EJB on a new server S3. The business method of the EJB invokes a new resource r3. Meanwhile, the EJB container on server S3 also registers a new Synchronization object Sync3 (on server S3).

As a result, the state information of the transaction now changes as follows:

| | |
|---|---|
| Subcoordinators (servers) that are now currently participating in transaction T1: | S2, S3 |
| Synchronization objects that are now registered with T1: | Sync1 (from server S1) |
| | Sync2 (from server S2) |
| | Sync3 (from server S3) |
| Resources now participating in transaction T1: | r1 (from server S1) |
| | r2 (from server S2) |
| | r3 (from server S3) |

Server S2 has now completed its own Synchronization callbacks. It passes the pre-prepare request to the next subcoordinator along the chain, which is now server S3. Note that when server S2 first entered its pre-prepare phase, it was the last subcoordinator in the chain, but now it is not, and instead server S3 is the last subcoordinator in the chain.

4. Server S3 now executes the pre-prepare phase. Server S3 calls Synchronization callbacks that are registered locally: Sync3. Server S3 determines that it is really the last subcoordinator in the chain, as the chain currently exists, and therefore it sends back a pre-prepare reply to the transaction coordinator, server S1.

5. Server (and in this instance also the transaction coordinator) S1 knows that the pre-prepare phase is done. It can then move forward to prepare and then commit phase.

Figure 6:
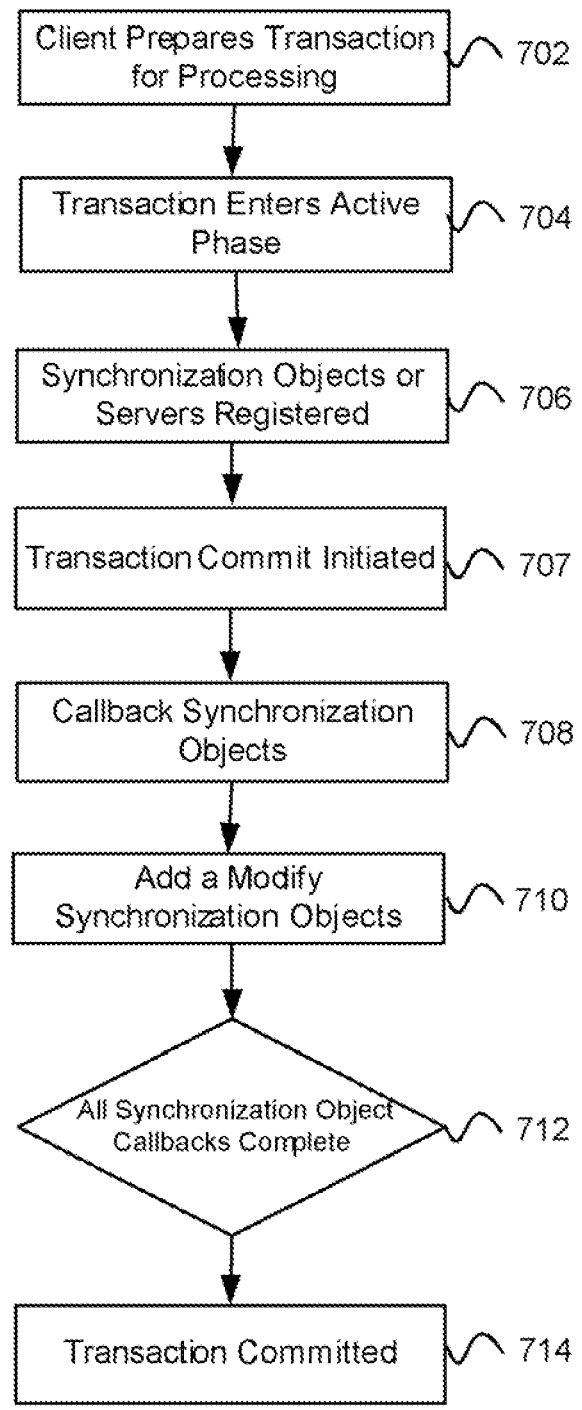
FIG. 6 shows a flowchart of a transaction synchronized callback process in accordance with an embodiment of the invention.

FIG. 6 illustrates a flowchart showing the steps of a synchronized callback process in accordance with an embodiment of the invention. In step 702, the client or client application prepares a transaction for processing. During the active phase (step 704), the various Synchronization objects, resources or servers that are to take place in the transaction processing are registered (step 706). When the transaction commit is called (step 707), each Synchronization object or resource is called in turn (step 708). At any time, in step 710, the list of Synchronization objects can be modified to add resources, such as participating servers, to the callback loop. When all Synchronization objects in the current list have returned their callback (step 712), the transaction is committed (step 714).

Support For Beans Invoking Beans During beforeCompletion

Neither the EJB nor the JTA specifications clarify how to handle the case where a bean's beforeCompletion or ejbStore method (that is called prior to prepare) invokes another bean whose beforeCompletion and/or ejbStore method has already been called. The invention supports such a scenario across multiple servers.

Figure 7:
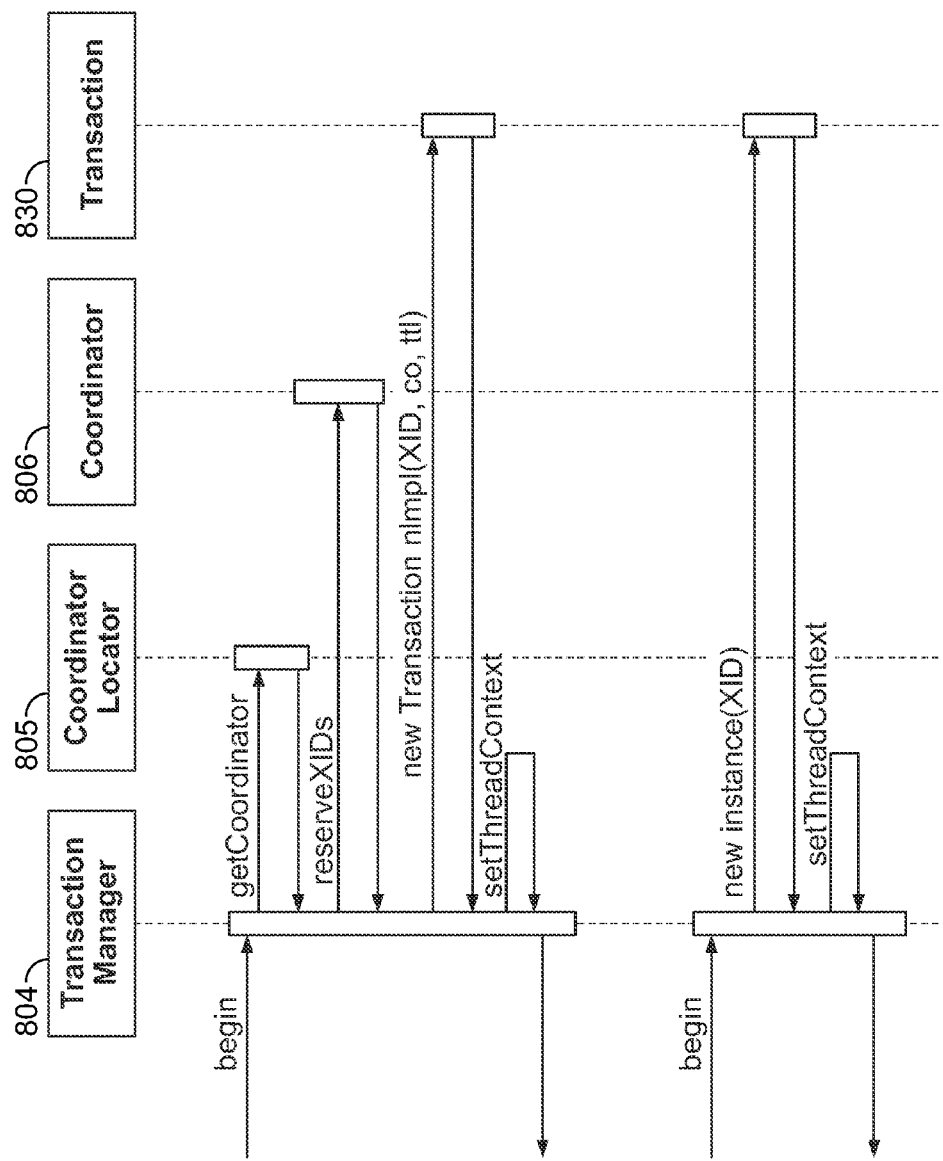
FIG. 7 shows an illustration of a begin transaction lifecycle in accordance with an embodiment of the invention.

FIGS. 7 through 14 illustrate the lifecycles associated with various phases of the synchronized callback process in accordance with a particular implementation that can be used with Weblogic Server It will evident to one skilled in the art that other lifecycles and implementations can be used to provide a synchronized callback within the spirit and scope of the invention. FIG. 7 shows an illustration of a begin transaction lifecycle in accordance with an embodiment of the invention. As shown in FIG. 7, the process begins with a transaction request being received at the transaction manager 804. The transaction manager 804 makes a call to the coordinator locator 805 to select a transaction coordinator 806. The transaction coordinator 806 reserves a transaction identifier, and associates this with the new transaction 830. The request is assigned to one of a pool of threads and returned to the via the transaction manager 804. Subsequent requests are assigned to different threads from the pool.

Figure 8:
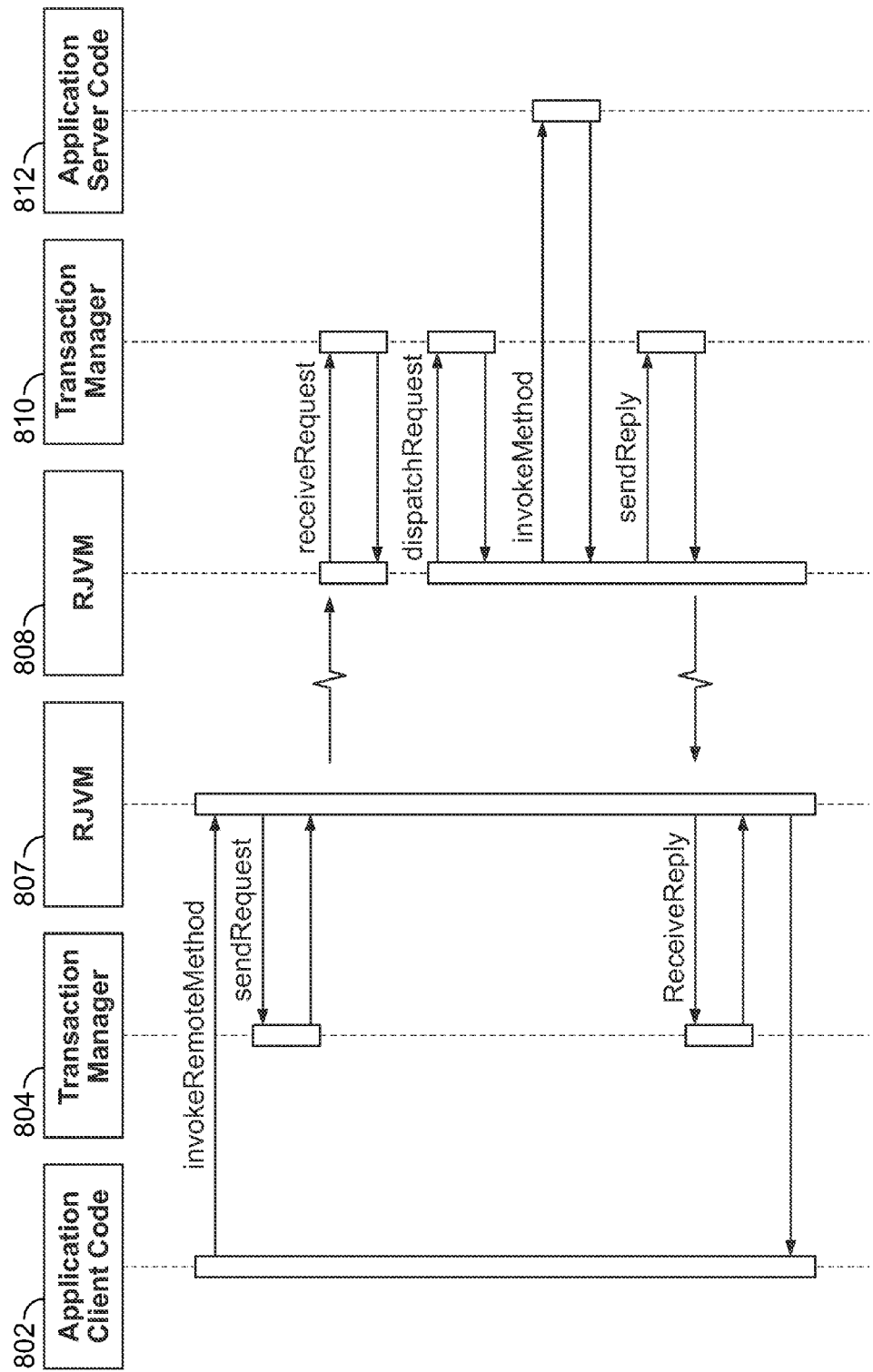
FIG. 8 shows an illustration of a transaction propagation lifecycle in accordance with an embodiment of the invention.

FIG. 8 shows an illustration of a transaction propagation lifecycle in accordance with an embodiment of the invention. As shown in FIG. 8, the client application 802 makes a remote method invoke on the local (client) Java Virtual Machine (RJVM) 807 for communication to the server. The client transaction manager 804 intercepts the request and passes is to the server transaction manager 810 via the servers RJVM 808. The server transaction manager 810 is responsible for invoking the method upon the server application 812. When a reply is received from the server application 812, the server transaction manager 810 is again responsible for communicating the reply to the client transaction manager 804, via the client and server RJVM's. The client transaction manager 804 returns the reply to the client application 802.

Figure 9:
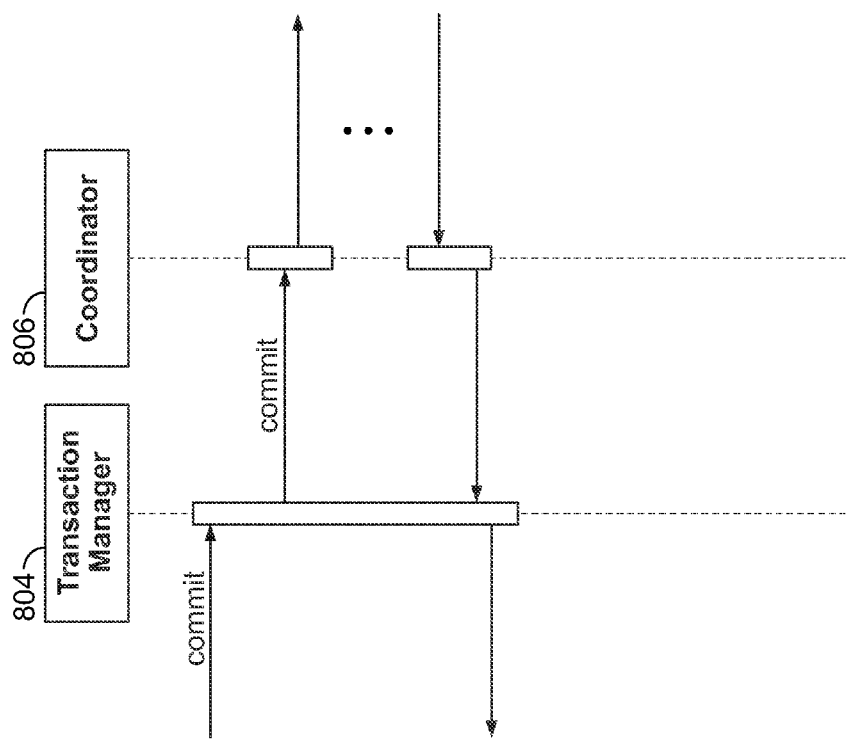
FIG. 9 shows an illustration of a commit lifecycle in accordance with an embodiment of the invention.

FIG. 9 shows an illustration of a commit lifecycle in accordance with an embodiment of the invention. As shown in FIG. 9, the transaction manager 804 receives a commit. The commit is passed to the transaction coordinator 806 for processing. When the commit is complete, it is returned to the transaction manager 804.

Figure 10:
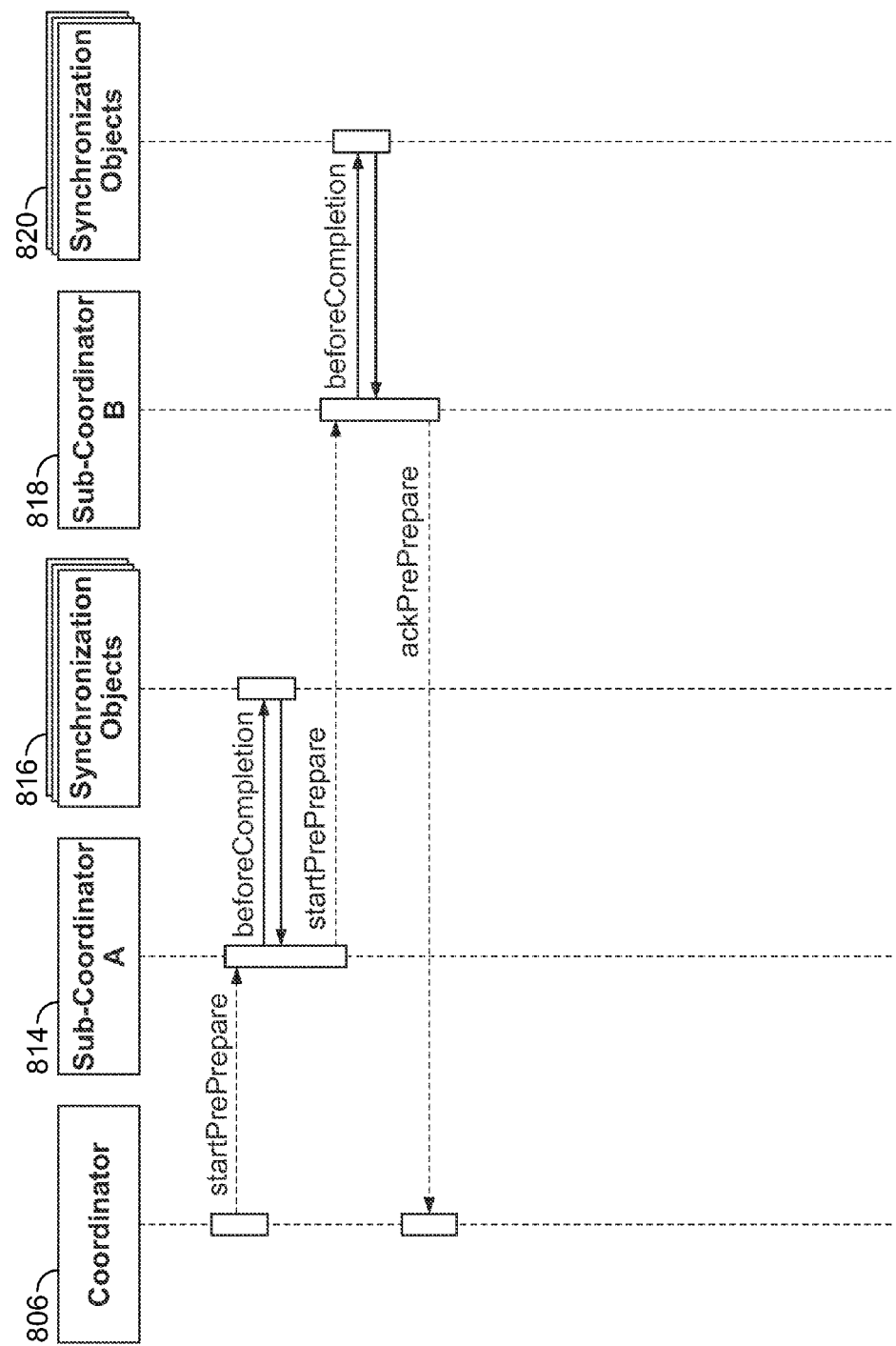
FIG. 10 shows an illustration of a preprepare phase lifecycle in accordance with an embodiment of the invention.

FIG. 10 shows an illustration of a preprepare phase lifecycle in accordance with an embodiment of the invention showing how Synchronization objects can be added into the beforeCompletion loop. As shown in FIG. 10, the transaction coordinator 806 initiates the preprepare process with a startPrePrepare call to a first subcoordinator 814. The subcoordinator is responsible for moving the transaction through the beforeCompletion phase. At any time before the beforeCompletion phase completes, Synchronization objects 816 can be added into the loop. When all Synchronization objects have been added, a second subcoordinator 818 acts upon all Synchronization objects 820 at the same time. A PrePrepare acknowledgment is then returned to the transaction coordinator 806. It will be evident to one skilled in the art that in the lifecycle shown in FIG. 10, and in the others described below, that the first and second subcoordinators may be the same entity. Similarly, the first and second set of Synchronization objects may be the same, as may the first and second set of XAResource objects. It will further be evident that, while only two subcoordinators or two sets of resource objects are shown in the examples given herein, the invention allows multiple subcoordinators and multiple sets of Synchronization objects and resources to be simultaneously involved in the transaction commit process. Claiming the subcoordinates and Synchronization objects in this manner minimizes the number of communication exchanges with the coordinator.

Figure 11:
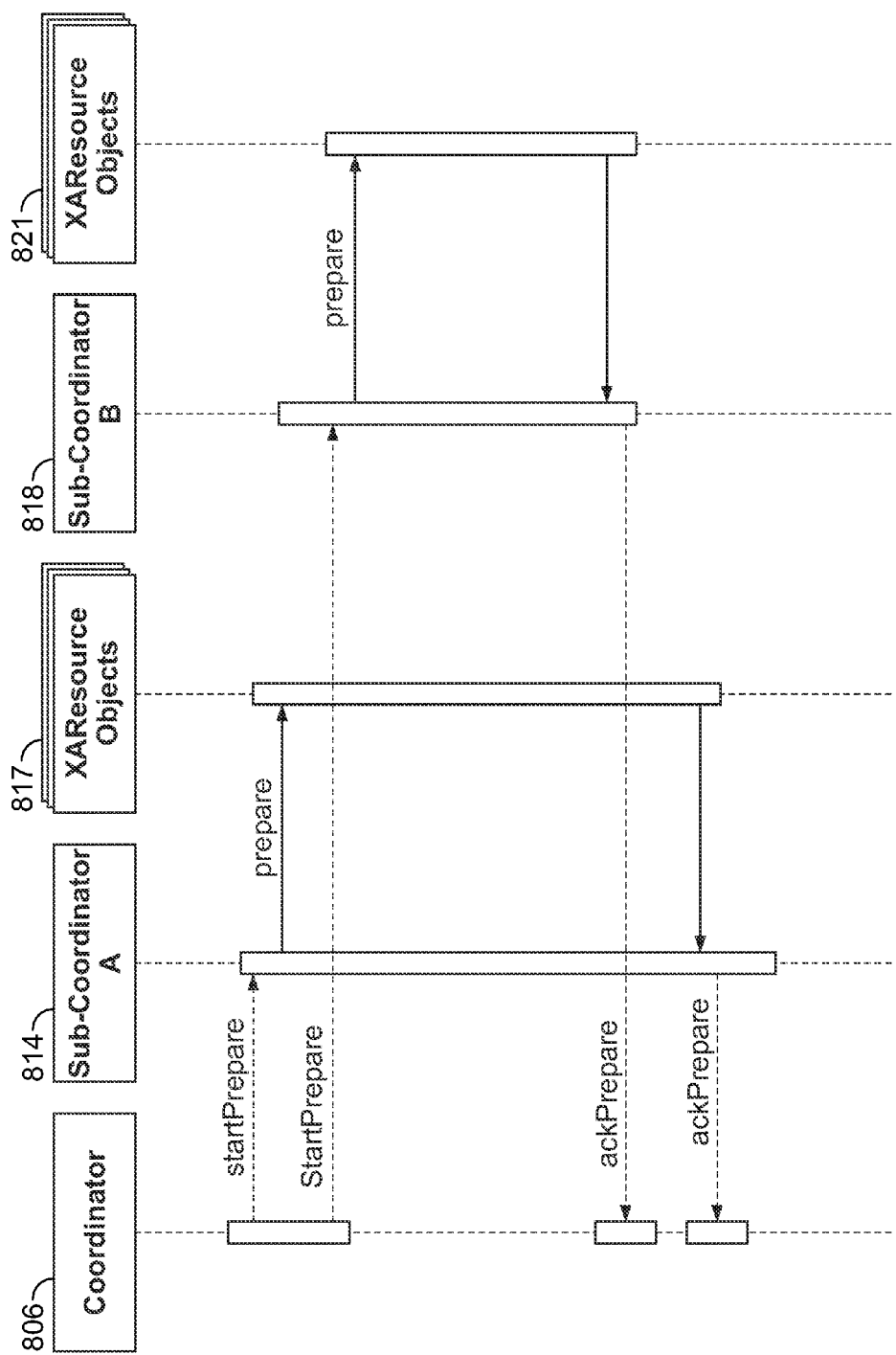
FIG. 11 shows an illustration of a prepare phase lifecycle in accordance with an embodiment of the invention.

FIG. 11 shows an illustration of a prepare phase lifecycle that uses XAResource objects, in accordance with an embodiment of the invention. As shown in FIG. 11, a transaction coordinator 806 with a startPrepare call to a first subcoordinator 814. The subcoordinator (or a plurality of subcoordinators) is responsible for preparing the transaction against a first set of XAResource objects 817. At the same time the transaction coordinator may send a startPrepare call to a second subcoordinator 818, for preparing the transaction against a second set of XAResource objects 821. When each XAResource object is prepared an acknowledgment is returned to the transaction coordinator 806.

Figure 12:
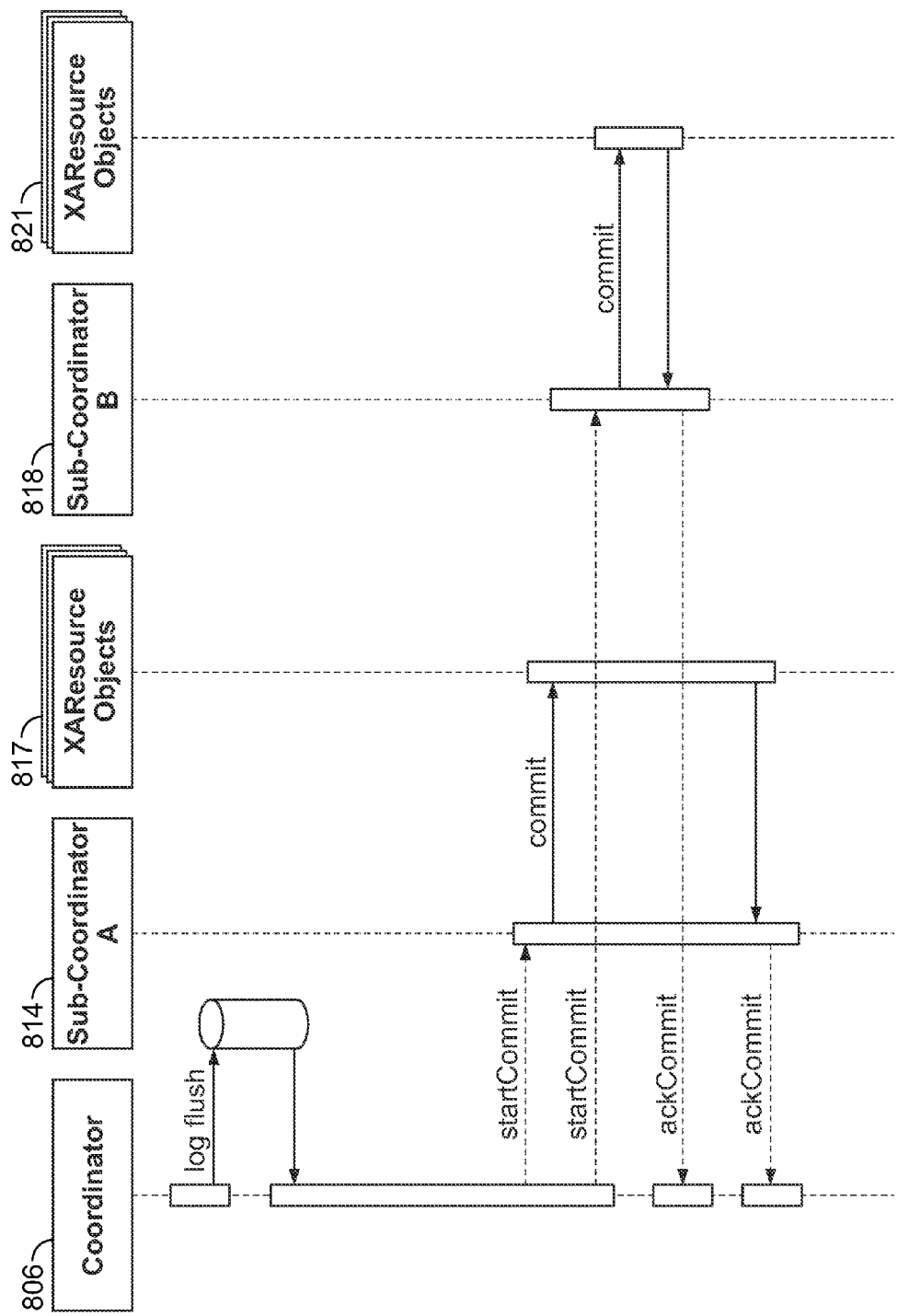
FIG. 12 shows an illustration of a commit phase lifecycle.

FIG. 12 shows an illustration of a commit phase lifecycle. As shown in FIG. 12, the transaction coordinator 806 first flushes the transaction log. A startCommit call is sent to a first subcoordinator 814. The first subcoordinator issues a commit against a first set of XAResource objects 817. At the same time the transaction coordinator may send a startCommit to a second subcoordinator 818. The second subcoordinator issues a commit against a second set of XAResource objects 821. When both commits are complete an acknowledgment is sent to the transaction coordinator 806.

Figure 13:
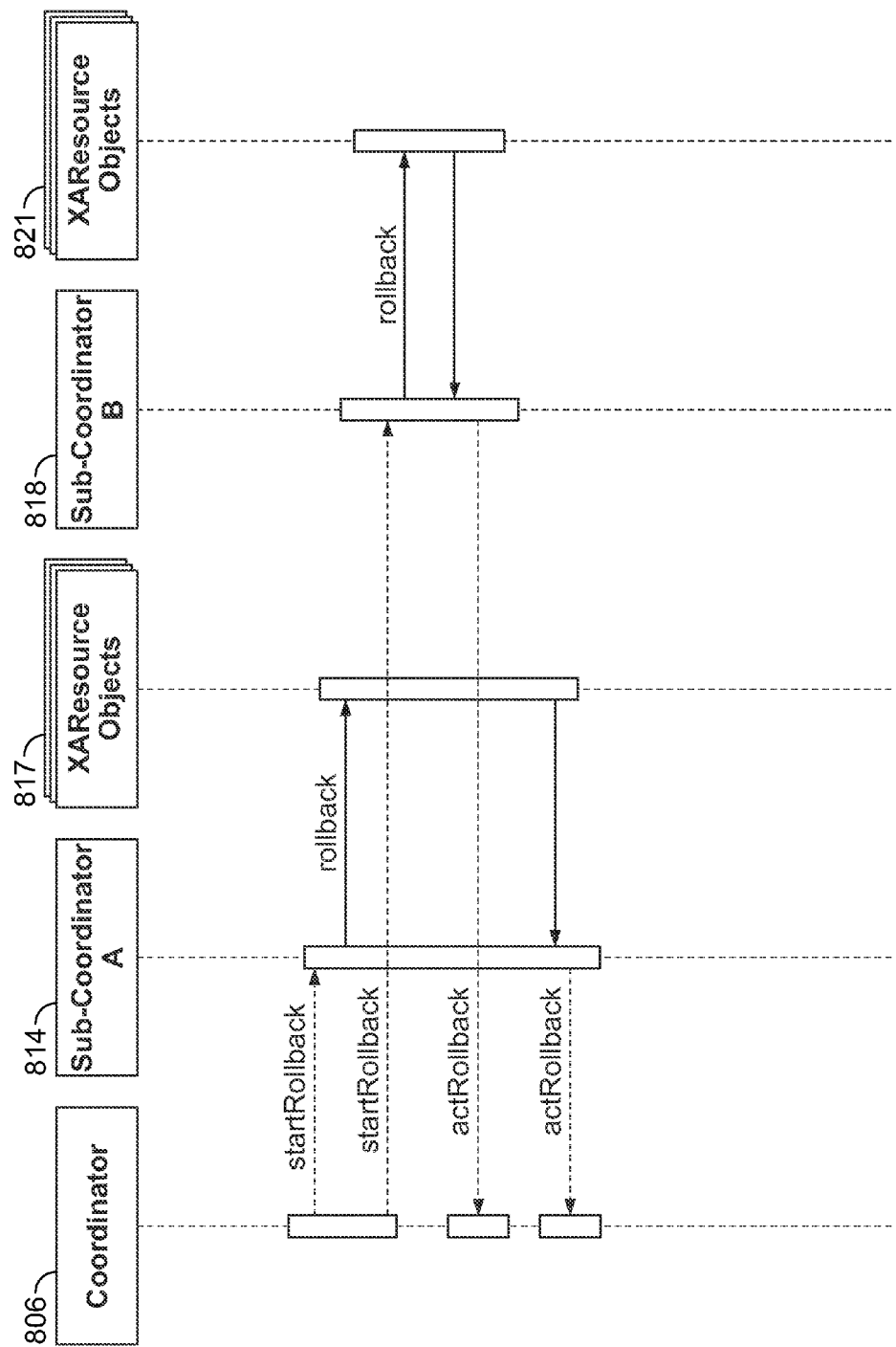
FIG. 13 shows an illustration of a rollback lifecycle in accordance with an embodiment of the invention.

FIG. 13 shows an illustration of a rollback lifecycle in accordance with an embodiment of the invention. As shown in FIG. 13, when the system wishes to perform a rollback the transaction coordinator 806 issues a startRollback to a first subcoordinator 814. The subcoordinator is responsible for performing the rollback against a first set of XAResource objects 817. At the same time, the system may perform a rollback on a second set of XAResource objects 821 by issuing a startRollback command to the second set of XAResource objects 821 via a second subcoordinator. When both rollbacks are complete, an acknowledgment is returned to the transaction coordinator 806.

Figure 14:
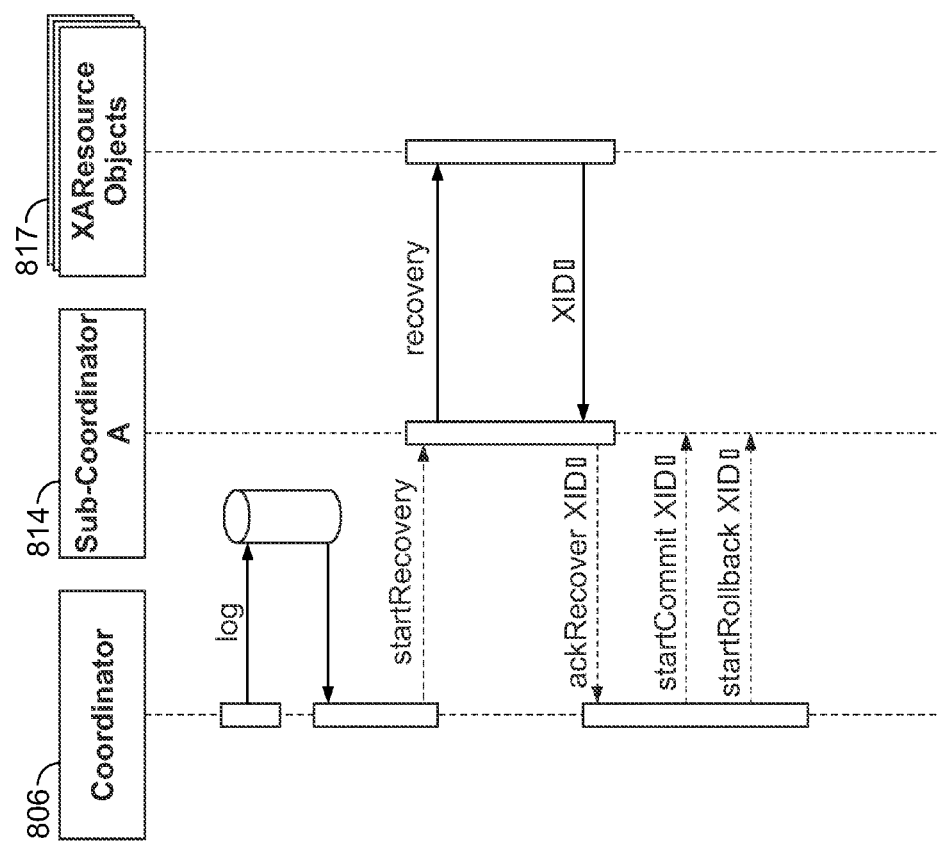
FIG. 14 shows an illustration of a recovery lifecycle in accordance with an embodiment of the invention.

FIG. 14 shows an illustration of a recovery lifecycle in accordance with an embodiment of the invention. As shown in FIG. 14, the recovery process is initiated by a request from the transaction coordinator 806 to access the transaction recovery log. When the transaction coordinator 806 issues a startRecovery request to a subcoordinator 814 to perform a recovery, the subcoordinator uses the information in the transaction recovery log to perform a recovery against the set of XAResource objects. The subcoordinator 814 uses the transaction identifier to correctly identify each recovery, and this transaction identifier is returned to the transaction coordinator 806. The transaction coordinator 806 then issues a rollback request to the subcoordinator 814.

Transactions in EJB Applications

FIG. 15 illustrates how transactions between EJB client applications and a server application are processed. As shown in FIG. 15 an EJB client application 402 uses an EJB container 406 to pass a transaction 404 to a server application 410. Application servers incorporating the invention support two types of transactions in EJB applications: container-managed transactions, and bean-managed transaction.

In container-managed transactions, the server EJB container is responsible for managing the transaction demarcation. Transaction attributes in the EJB deployment descriptor are used to determine how the Server EJB container handles transactions with each method invocation. In bean-managed transactions, the EJB itself manages the transaction demarcation. The EJB makes explicit method invocations on a UserTransaction object to begin, commit, and if necessary to roll back transactions. The sequence of transaction events differs between container-managed and bean-managed transactions. For EJB applications with container-managed transactions, a basic transaction works in the following way:

In the EJB's deployment descriptor, the bean provider or application assembler specifies the transaction type for container-managed demarcation.

In the EJB's deployment descriptor, the bean provider or application assembler specifies the default transaction attribute for the EJB, which is usually one of the following settings: "NotSupported", "Required", "Supports", "RequiresNew", "Mandatory", or "Never".

Optionally, in the EJB's deployment descriptor, the bean provider or application assembler specifies the transaction attribute for one or more methods.

When a client application 402 invokes a method in the EJB, the EJB container checks the transaction attribute setting in the deployment descriptor for that method. If no setting is specified for the method, then the EJB uses the default transaction attribute setting for that EJB.

The EJB container 406 takes the appropriate action depending on the applicable transaction attribute setting. For example, if the transaction attribute setting is "Required", the EJB container invokes the method within the existing transaction context or, if the client called without a transaction context, the EJB container begins a new transaction before executing the method.

In another example, if the transaction attribute setting is "Mandatory", the EJB container invokes the method within the existing transaction context. If the client called without a transaction context, the EJB container throws an exception error.

During invocation of a business method 408, if it is determined that a rollback is required, the business method calls an EJB Rollback method, which notifies the EJB container that the transaction is to be rolled back at the end of the method invocation.

At the end of the method execution and before the result is sent to the client, the EJB container completes the transaction, either by committing the transaction at the server application 410 (in which case the transaction may be written to a transaction log 412) or rolling it back.

For EJB applications with bean-managed transaction demarcations, a basic transaction works in the following way:

In the EJB's deployment descriptor, the bean provider or application assembler specifies the transaction type for bean-managed demarcation.

The client application 402 uses JNDI to obtain an object reference to ta UserTransaction object for the Server domain.

The client application 402 begins a transaction 404 using the UserTransaction.begin method, and issues a request to the EJB through the EJB container. All operations on the EJB execute within the scope of a transaction.

If a call to any of these operations raises an exception (either explicitly or as a result of a communication failure), the exception can be caught and the transaction can be rolled back (UserTransaction.rollback).

If no exceptions occur, the client application commits the current transaction against the server application 410 using the UserTransaction.commit method. This method ends the transaction and starts the processing of the operation. The transaction is committed only if all of the participants in the transaction agree to commit.

The UserTransaction.commit method causes the EJB container to call the transaction manager to complete the transaction.

The transaction manager is responsible for coordinating with the resource managers to update any databases.

Transactions Sample EJB Code

The following section provides a walkthrough of sample code fragments from a class in an EJB application. The code fragments demonstrate using the UserTransaction object for bean-managed transaction demarcation. The deployment descriptor for this bean specifies the transaction type for transaction demarcation.

The transaction package must first be imported and/or updated. Listing 1 shows an example code for importing the necessary packages for transactions.

```
import javax.naming.*;
import javax.transaction.UserTransaction;
import javax.transaction.SystemException;
import javax.transaction.HeuristicMixedException
import javax.transaction.HeuristicRollbackException
import javax.transaction.NotSupportedException
import javax.transaction.RollbackException
import javax.transaction.IllegalStateException
import javax.transaction.SecurityException
import java.sql.*;
import java.util.*;
import weblogic.jndi.*;
```

Listing 1

After importing these classes, an instance of the UserTransaction object is initialized to null. The next step involves using JNDI to return an object reference. Listing 2 shows an example of using JNDI to look up an object reference.

```
Context ctx=null;
Hashtable env=new Hashtable( );
env.put       (Context.INITIAL_CONTEXT_FACTORY,
   "weblogic.jndi.WLInitialContextF actory");
env.put (Context.PROVIDER_URL, "t3://localhost:7001");
env.put (Context.SECURITY_PRINCIPAL, "Fred");
env.put (Context.SECURITY_CREDENTIALS, "secret");
ctx=new InitialContext (env);
UserTransaction tx=(UserTransaction)
    ctx.lookup ("javax.transaction.UserTransaction");
```

Listing 2

The transaction must then be generated or started. Listing 3 shows starting a transaction by getting a UserTransaction object and calling the transaction begin method. Database operations that occur after this method invocation, and prior to completing the transaction, exist within the scope of this transaction.

```
UserTransaction tx=(UserTransaction)
    ctx.lookup ("javax.transaction.UserTransaction");
tx.begin ( );
```

Listing 3

The final step in the EJB implementation is to complete the transaction. Listing 4 shows a code for completing the transaction depending on whether an exception was thrown during any of the database operations that were attempted within the scope of this transaction:

```
tx.commit ( );
// or:
tx.rollback ( );
```

Listing 4

If an exception was thrown during any of the database operations, the application calls the javax.transaction. UserTransaction.rollback( ) method to rollback the transaction.

If no exception was thrown, the application calls the javax.transaction. UserTransaction.commit( ) method to attempt to commit the transaction after all database operations completed successfully. Calling this method ends the transaction and starts the processing of the operation, causing the WebLogic Server EJB container to call the transaction manager to complete the transaction. The transaction is committed only if all of the participants in the transaction agree to commit.

Transactions in WebLogic Server RMI Applications

Figure 16:
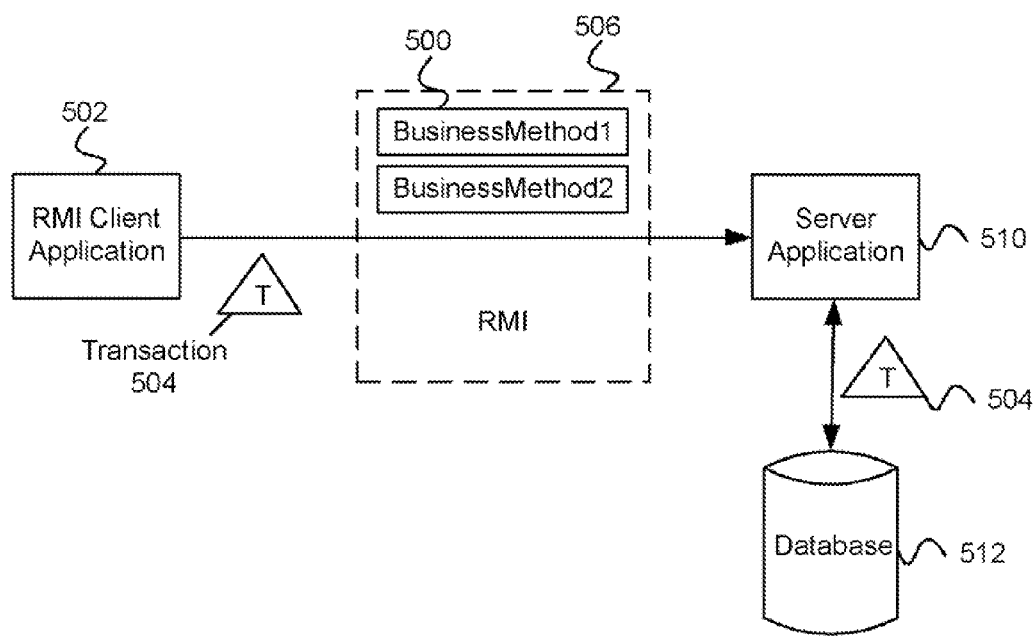
FIG. 16 illustrates how transactions work in an RMI application in accordance with an embodiment of the invention.

FIG. 16 illustrates how transactions work in a RMI application. For RMI client and server applications, a basic transaction works in the following way:

The application 502 uses JNDI to return an object reference to an UserTransaction object 506 for the Server domain.

Obtaining the object reference begins a conversational state between the application and that object. The conversational state continues until the transaction 504 is completed (i.e., either committed or rolled back). Once instantiated, RMI objects remain active in memory until they are released, which is typically during server shutdown.

The client application begins a transaction using the UserTransaction.begin method, and issues a request to the server application.

All operations on the server application execute within the scope of a transaction.

If a call to any of these operations raises an exception (either explicitly or as a result of a communication failure), the exception can be caught and the transaction can be rolled back (UserTransaction.rollback).

If no exceptions occur, the client application commits the current transaction using the UserTransaction.commit method. This method ends the transaction and starts the processing of the operation. The transaction is committed only if all of the participants in the transaction agree to commit.

The UserTransaction.commit method causes the server to call the transaction manager to complete the transaction.

The transaction manager is responsible for coordinating with the resource managers to update any databases 512.

Transactions Sample RMI Code

This section provides a walkthrough of sample code fragments from a class in an RMI application. The code fragments demonstrate using the UserTransaction object for RMI transactions.

Again, as an initial step, the packages must be imported and/or updated if necessary. Listing 5 shows importing the necessary packages.

```
import javax.naming.*;
import java.rmi.*;
import javax.transaction.UserTransaction;
import javax.transaction.SystemException;
import javax.transaction.HeuristicMixedException;
import javax.transaction.HeuristicRollbackException;
import javax.transaction.NotSupportedException;
import javax.transaction.RollbackException;
import javax.transaction.IllegalStateException;
import javax.transaction.SecurityException;
import java.sql.*;
import java.util.*;
import weblogic.jndi.*;
```

Listing 5

After importing these classes, an instance of the UserTransaction object is initialized to null.

JNDI is used to return an object reference to the UserTransaction Object. Listing 6 shows searching the JNDI tree to return an object reference to the UserTransaction object for the appropriate WebLogic Server domain.

Obtaining the object reference begins a conversational state between the application and that object. The conversational state continues until the transaction is completed (committed or rolled back). Once instantiated, RMI objects remain active in memory until they are released.
Context ctx=null;
Hashtable env=new Hashtable ( );
env.put (Context.INITIAL_CONTEXT_FACTORY, "weblogic.jndi.WLInitialContextFactory");
// Parameters for the WebLogic Server.
// Substitute the correct hostname, port number
user name, and password for your environment:
env.put (Context.PROVIDER_URL, "t3://localhost:7001");
env.put (Context.SECURITY_PRINCIPAL, "Fred");
env.put (Context.SECURITY_CREDENTIALS, "secret");
ctx=new InitialContext (env);
UserTransaction tx=(UserTransaction)
ctx.lookup ("javax.transaction.UserTransaction");

Listing 6

The transaction is then generated or started. Listing 7 shows starting a transaction by calling the javax.transaction.UserTransaction.begin( ) method. Database operations that occur after this method invocation and prior to completing the transaction exist within the scope of this transaction.
UserTransaction tx=(UserTransaction)
ctx.lookup ("javax.transaction.UserTransaction");
tx.begin ( );
Completing a Transaction Listing 7

As with the EJB implementation, the final step in the transaction process is to complete the transaction. Listing 8 shows completing the transaction depending on whether an exception was thrown during any of the database operations that were attempted within the scope of this transaction:
tx.commit ( );
// or:
tx.rollback ( );

Listing 8

If an exception was thrown, the application calls the javax.transaction. UserTransaction.rollback( ) method if an exception was thrown during any of the database operations.

If no exception was thrown, the application calls the javax.transaction. UserTransaction.commit( ) method to attempt to commit the transaction after all database operations completed successfully. Calling this method ends the transaction and starts the processing of the operation, causing WebLogic Server to call the transaction manager to complete the transaction. The transaction is committed only if all of the participants in the transaction agree to commit.

The foregoing description of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for transaction processing in a computer system that synchronizes callbacks with the completion of said transaction, comprising the steps of receiving a request from a client to process a transaction at a plurality of servers;

registering during an active phase of the transaction an initial set of resources that are to take part in the transaction;

determining a state of the transaction to reflect the initial set of resources, and a chain of servers on which those resources exist;

subsequently receiving a request from a client to call a transaction commit;

preprepareing said transaction during a preprepare phase of the transaction, including the substeps of handing off the transaction to a first server in the plurality of servers, calling any resource callbacks that are registered locally at the first server, determining if a second server is in the chain, and if so communicating a preprepare request to the second server, allowing the second server to dynamically add an additional resource to said set of registered resources, including when the additional resource is at an additional server then adding a next server to the chain, and modifying the state of the transaction to reflect both the next server in the chain, and the additional resource thereon, repeating the preprepare steps in a circular flow as necessary until all servers in the chain have completed the preprepare phase, communicating a preprepare reply from the server that was last called in the chain to the first server;

preparing the resources in said set of registered resources; and committing the resources in the set of registered resources.

2. A system for transaction processing, comprising:

a plurality of servers that include resources that can be used in a transaction, said plurality of servers further comprising a first server that determines a state of the transaction to reflect an initial set of resources that are to take part in the transaction, and an initial chain of servers on which those resources exist;

subsequently receives a request from a client to call a transaction commit;

performs a preprepare phase of the transaction that includes calling resource callbacks that are registered locally, determining if an additional resource and additional resource callback is required, when the additional resource is at an additional server then adding the additional server to the chain, and updating the state of the transaction to reflect both the additional server in the chain and the additional resource thereon, and communicating a preprepare request to a next server in the chain;

wherein the next server receives the preprepare request from the first server and then also performs the preprepare phase, including adding additional servers and additional resource callbacks thereon if additional servers and additional resource callbacks are required, communicating preprepare requests to a next server in the chain, and performing preprepare phases at the next server, until all of the servers in the chain have completed the preprepare phase; and wherein the first server receives a preprepare reply from the server that was last called in the chain, prepares the resources identified in the updated transaction state, and then commits those resources.

3. The system of claim 2 wherein the first server is selected from the plurality of servers.

4. The system of claim 3 wherein each of the plurality of servers is capable of receiving requests from clients to process transactions, and wherein for a particular transaction request the server selected as the first server is the server that receives the transaction request from a client.

5. The system of claim 2 wherein additional servers can be added to the transaction anytime during the preprepare phase before the preprepare reply is sent from the server that was last called in the chain to the first server.

6. The system of claim 2 wherein the first server is identified as the transaction coordinator for the transaction, and all other servers participating in the transaction are identified as transaction subcoordinators for the transaction.

7. The system of claim 2 wherein the resource callback is a Synchronization object callback.

8. A method for transaction processing, comprising:
receiving at a first server a request to process a transaction;
determining a state of the transaction to reflect an initial set of resources that are to take part in the transaction, and an initial chain of servers on which those resources exist;
subsequently receiving at the first server a request from a client to call a transaction commit;
performing a preprepare phase of the transaction at the first server that includes
calling resource callbacks that are registered locally,
determining if an additional resource and additional resource callback is required,
when the additional resource is at an additional server then adding the next server to the chain, and updating the state of the transaction to reflect both the next server in the chain and the additional resource thereon, and
communicating a preprepare request to the next server in the chain;
receiving the preprepare request at the next server and then performing the preprepare phase at the next server, including adding additional servers and additional resource callbacks thereon, if additional server and additional resource callbacks are required, communicating preprepare requests to a next server in the chain, and performing preprepare phases at the next server, until all of the servers in the chain have completed the preprepare phase;
receiving a preprepare reply at the first server from the server that was last called in the chain;
preparing the resources identified in the updated transaction state; and
committing the resources.

9. The method of claim 8 wherein the first server is selected from the plurality of servers.

10. The method of claim 9 wherein each of the plurality of servers is capable of receiving requests from clients to process transactions, and wherein for a particular transaction request the server selected as the first server is the server that receives the transaction request from a client.

11. The method of claim 8 wherein additional servers can be added to the transaction anytime during the preprepare phase before the preprepare reply is sent from the server that was last called in the chain to the first server.

12. The method of claim 8 wherein the first server is identified as the transaction coordinator for the transaction, and all other servers participating in the transaction are identified as transaction subcoordinators for the transaction.

13. The method of claim 8 wherein the resource callback is a Synchronization object callback.

14. A computer readable medium including instructions stored thereon which when executed cause the computer to perform the steps of:
receiving at a first server a request to process a transaction;
determining a state of the transaction to reflect an initial set of resources that are to take part in the transaction, and an initial chain of servers on which those resources exist;
subsequently receiving at the first server a request from a client to call a transaction commit;
performing a preprepare phase of the transaction at the first server that includes
calling resource callbacks that are registered locally,
determining if an additional resource and additional resource callback is required,
when the additional resource is at a next server then adding a next server to the chain, and updating the state of the transaction to reflect both the next server in the chain and the next resource thereon, and
communicating a preprepare request to the next server;
receiving the preprepare request at the next server and then performing the preprepare phase at the next server, including adding next servers and additional resource callbacks thereon, if additional server and additional server and additional resource callbacks are required, communicating preprepare requests to other servers, and performing preprepare phases at the other servers, until all of the servers in the chain have completed the preprepare phase;
receiving a preprepare reply at the first server from the server that was last called in the chain;
preparing the resources identified in the updated transaction state; and
committing the resources.

15. The computer readable medium of claim 14 wherein the first server is selected from the plurality of servers.

16. The computer readable medium of claim 15 wherein each of the plurality of servers is capable of receiving requests from clients to process transactions, and wherein for a particular transaction request the server selected as the first server is the server that receives the transaction request from a client.

17. The computer readable medium of claim 14 wherein next servers can be added to the transaction anytime during the preprepare phase before the preprepare reply is sent from the server that was last called in the chain to the first server.

18. The computer readable medium of claim 14 wherein the first server is identified as the transaction coordinator for the transaction, and all other servers participating in the transaction are identified as transaction subcoordinators for the transaction.

19. The computer readable medium of claim 14 wherein the resource callback is a Synchronization object callback.

* * * * *

UNITED STATES PATENT AND TRADEMARK OFFICE
CERTIFICATE OF CORRECTION

| | |
|---|---|
| PATENT NO. | : 7,337,441 B2 |
| APPLICATION NO. | : 10/196322 |
| DATED | : February 26, 2008 |
| INVENTOR(S) | : Felt et al. |

Page 1 of 1

It is certified that error appears in the above-identified patent and that said Letters Patent is hereby corrected as shown below:

In column 1, line 11, delete "FEATURE"Application" and insert -- FEATURE" Application --, therefor.

In column 1, line 17, delete "REFERENCE" and insert -- REFERENCES --, therefor.

In column 10, line 9, delete "112that" and insert -- 112 that --, therefor.

In column 16, line 39, after "to" delete "ta" and insert -- a --, therefor.

In column 17, line 26, delete "F actory" and insert -- Factory --, therefor.

In column 19, line 9, before "user" insert -- // --.

In column 19, line 67, in claim 1, after "of" insert -- : --.

In column 20, line 26, in claim 1, after "resource" insert -- , --.

In column 22, line 29, in claim 14, delete "next" and insert -- additional --, therefor.

In column 22, line 34, in claim 14, delete "next" and insert -- additional --, therefor.

In column 22, line 35–36, in claim 14, after "additional server" delete "and additional server".

In column 22, line 56, in claim 17, delete "next" and insert -- additional --, therefor.

Signed and Sealed this

Third Day of August, 2010

David J. Kappos
*Director of the United States Patent and Trademark Office*